July 15, 1958
L. C. GRAHAM
2,843,086
DOUBLE-DECK CONVEYOR CLEANING
DEVICE FOR POULTRY BATTERIES
Filed Feb. 27, 1957
2 Sheets-Sheet 2
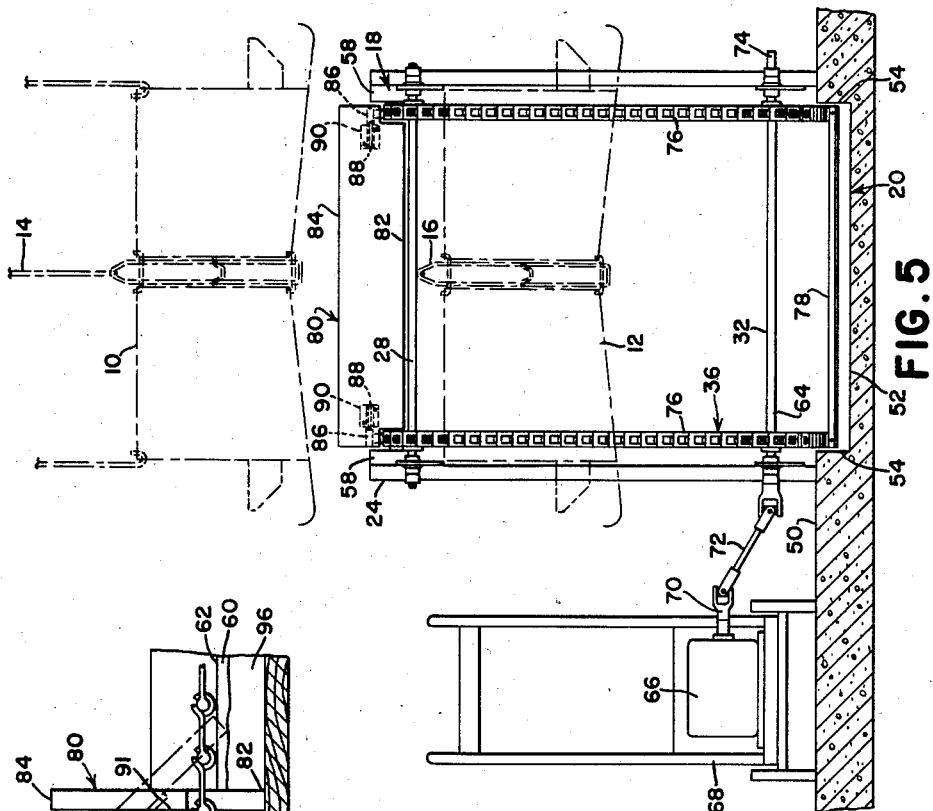
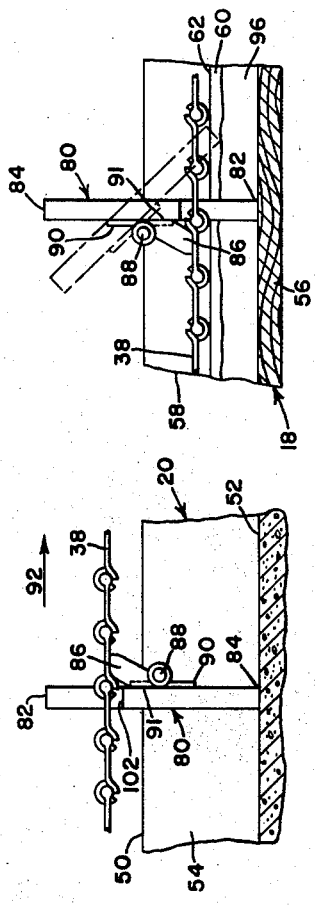
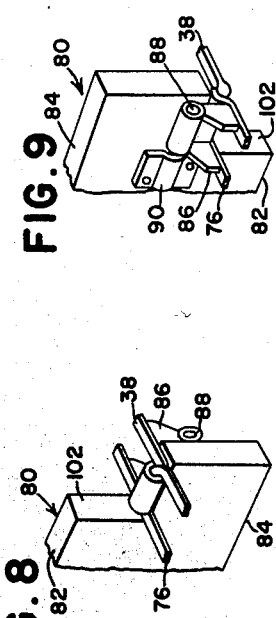
*INVENTOR.*
L. C. GRAHAM
BY
ATTORNEY

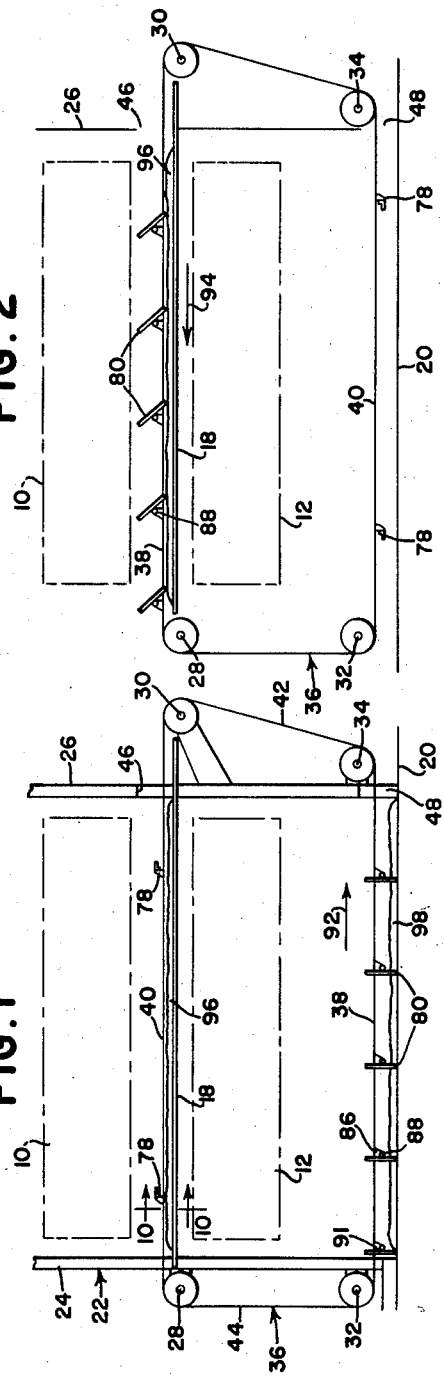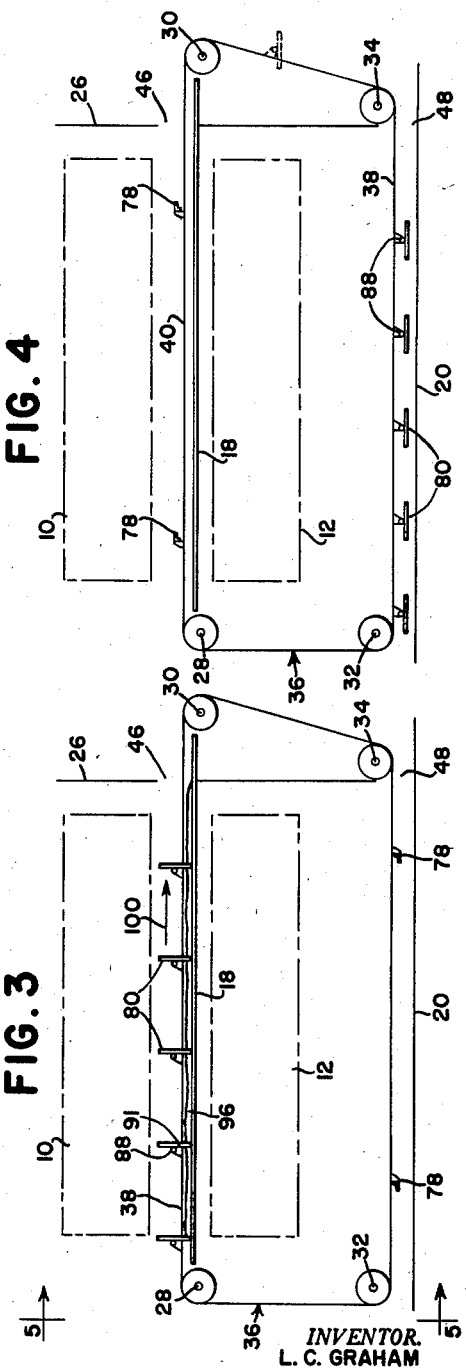

United States Patent Office 2,843,086
Patented July 15, 1958

2,843,086

DOUBLE-DECK CONVEYOR CLEANING DEVICE FOR POULTRY BATTERIES

Leonard C. Graham, Princeton, Iowa

Application February 27, 1957, Serial No. 642,836

14 Claims. (Cl. 119—22)

This invention relates to a conveyor system and more particularly to an apparatus in which a single conveyor is used to operate over vertically spaced apart surfaces.

The invention finds particular utility in the field of poultry raising wherein poultry are confined in cages arranged in upper and lower tiers and in which litter from the poultry drops from the open bottoms of the respective cages onto litter receiving troughs or equivalent surfaces. Since the upper trough is intermediate the upper and lower tiers of cages it is difficult to clean, and it is therefore a principal object of the present invention to provide improved means for facilitating the cleaning of not only the upper trough but the lower trough as well. In this respect the invention features a single endless conveyor arranged so as to have an active run lengthwise of the lower trough, a secondary run lengthwise of the upper trough and generally upright opposite end runs respectively at opposite ends of the troughs, the conveyor being arranged to be driven in one direction and in such amount that the active and secondary runs change places, whereby scraper means on the active run removes litter from the lower trough, the conveyor being then reversed so that the scraper means moves forwardly in the upper trough to remove litter therefrom. The significant aspect is that litter from both troughs is discharged at the same end of the structure and it is therefore unnecessary to provide separate widely spaced means for receiving the litter. It is an important object of the invention to arrange the scraper means in such manner that it is effective to scrape the troughs when the active run moves forwardly but is operative to overrun the litter in the troughs when the active run moves rearwardly. The invention has for further objects spacer means in that portion of the conveyor not occupied by scraper means; guide means particularly in the upper trough to carry the conveyor chains up out of contact with the upper trough litter; an improved structural arrangement which enables the conveyor and supports therefor to be readily incorporated in typical double-tiered cage systems; and such other objects and features as will appear in the ensuing specification and accompanying sheets of drawings, the several figures of which are described immediately below.

Figure 1 is a somewhat schematic view illustrating the conveyor in its starting position.

Figure 2 is a similar view showing the scraper means in an intermediate position ready to operate in the upper trough.

Figure 3 illustrates the scraper means in operating position.

Figure 4 illustrates the scraper means as returned to a position preliminary to its starting position.

Figure 5 is an enlarged end view of the structure as seen on the line 5—5 of Figure 3.

Figure 6 is an enlarged fragmentary elevation of a trough scraper operating in the lower trough.

Figure 7 is a similar view showing in full lines a trough scraper operating in the upper trough, and further illustrating in broken lines the overrunning position of the scraper.

Figure 8 is a fragmentary perspective of the scraper as it appears when operating in the lower trough.

Figure 9 is a fragmentary perspective of the scraper as operating in the upper trough.

Figure 10 is an enlarged section as seen along the line 10—10 of Figure 1.

Since the poultry cages themselves are or may be conventional they are shown in broken lines as arranged in upper and lower tiers 10 and 12 respectively, being typically elongated in fore and aft extent and appropriately suspended as suggested particularly at 14 and 16 in Figure 5. It should be observed at this point that directional expressions are used here and in the claims as a matter of convenience and not for the purpose of excluding other arrangements. The tier cages of course have open bottoms through which the poultry litter drops respectively into upper and lower troughs 18 and 20, which troughs are part of support structure 22 incorporated in the building as is conventional. This structure is illustrated mainly in Figure 1 as comprising a rear upright 24 and a front upright 26 spaced apart fore and aft and carrying a pair of upper conveyor supports 28 and 30 and a pair of lower conveyor supports 32 and 34. An endless flexible conveyor 36 is trained about these supports, which are typical cross shafts and associated sprockets which need not be described in detail, to afford an active run 38, an upper or secondary run 40 and front and rear generally upright end runs 42 and 44 respectively. In the starting position of the conveyor the active run 38 runs lengthwise of or occupies the lower trough 20 and the secondary run 40 occupies or runs lengthwise of the upper trough 18.

As illustrated in Figure 1, the upright 26 may be the end wall of a poultry house and has upper and lower openings 46 and 48 for accommodating the upper and lower runs of the conveyor, the front end run 42 being external to the building at what may be termed the front discharge end of the conveyor system. It is significant to note that all the litter removed from both troughs is discharged at this single discharge point.

As best shown in Figure 5 the lower trough 20 is preferably recessed in a floor 50 of concrete or other suitable material, thus affording a floor or bottom 52 and opposite side walls 54. One particular advantage of this arrangement is that the floor surface 50 may be swept directly into the trough 20. However, other forms of lower troughs may be used. The upper trough 18 is preferably constructed of wood; although this material does not exclude others, and as best seen in Figures 5 and 10 has a floor 56 and opposite side walls 58, each of which is flanked at its inner side by a fore-and-aft parallel guide 60. Each guide has a top surface 62 at a level intermediate the floor 18 and the tops of the side walls 58. The purpose of this construction will be brought out later.

The lower rear support 32 includes an input shaft 64 which serves as means for driving the conveyor 36 forwardly or reversely. A typical drive is illustrated in Figure 5 as comprising an electric motor 66 conveniently mounted on a wheeled truck 68 and having a drive shaft 70 which is connectible to and disconnectible from the input shaft 64 by a propeller shaft 72. In cages in which double tiers are arranged side by side, the opposite end of the shaft 64, as at 74, may be drivingly connected to the input end of a shaft comparable to the shaft 64. Since the propeller shaft 72 is disconnectible from the input shaft 64, the wheeled truck 68 may be moved about the poultry house to service all conveyor systems.

Suspension of the upper cage 10 at 14 may be effected from the ceiling or other overhead structure and suspension of the lower cages 12 at 16 may be effected as shown from the bottom of the upper trough 18.

The conveyor 36 comprises a pair of parallel endless elements, here shown as link chains 76, spaced apart to run closely adjacent to the respective side walls of the troughs. The chain portions of the secondary run are cross connected by spacer means, here a plurality of transverse angle bars 78 which rigidly cross connect the chains to maintain the laterally spaced apart relation thereof. In the case of the secondary run, the spacer means keeps the chains riding on the upper surfaces 62 of the guides 60. Thus, the chains are confined to ride the guides and cannot drop off into the upper trough litter.

The active run 38 of the conveyor carries trough-scraping means, here in the form of a plurality of transverse scrapers or flights 80, spaced apart lengthwise of the active run 38 in a zone substantially coextensive with the fore and aft extent of the cages. The troughs 18 and 20 are themselves substantially coextensive in length with each other and with the cages, except that both troughs extend forwardly beyond the cages so as to project at the discharge end of the system.

The scrapers will be described first in terms of their relationship to the active run in its starting position in the lower trough. The scraper as so disposed has upper and lower edge portions 82 and 84, the latter of which is normally in scraping relationship to the floor 52 of the lower trough (Figure 6). Because of its height the scraper extends both above and below the run 38. Stated otherwise, the lower portion of the scraper depends from the active run. Each scraper is connected to the active run by a one-way device incorporating a pivot on a transverse axis and a one-way stop, which are afforded by a pair of transversely alined pivot lugs 86 having transverse pivot or pintles 88 connected to the leading face of the scraper by a small plate 90. As shown in Figure 6, the pivot axis formed by the transversely alined pintles 88 is below the run 38 and is further ahead of the scraper 80. The front face portion of the flight or scraper 80 that extends above the pivot abuts the rear portion of the lug and affords a one-way stop device 91 in cooperation with the lug, preventing clockwise turning of the scraper relative to the run 38. Stated otherwise, the stop means prevents rearward swinging of the lower portion of the scraper relative to the run.

Now, when the conveyor is driven by the reversible motor or drive means 66 in such direction that the active run 38 moves forwardly or in a direction of the arrow 92 (Figures 1 and 6), the scrapers cannot turn clockwise for the reasons already stated. Consequently, litter that has dropped into the lower trough 18 will be scraped forwardly to the discharge end of the system. It will be understood that these scrapers 80 start in the upright positions of Figures 1 and 6 and that litter drops between the scrapers to be received by the lower trough. At the same time, there will be of course litter received on the upper trough as at 96. The lower trough litter is designated by the numeral 98. As the scrapers or flights are carried forwardly by the active run to remove litter from the lower trough, the active run travels upwardly and then rearwardly about the upper front conveyor support 30 and then travels rearwardly (arrow 94 in Figure 2) and into the upper trough 18, thus replacing the secondary run 40 which of course moves rearwardly, downwardly and forwardly to replace the active run 38. Although the scrapers 80 cannot pivot clockwise, as already stated, they can pivot counterclockwise relative to the run 38 and therefore as they travel upwardly they assume substantially horizontal positions (dotted lines in Figure 4) and, as they enter the upper trough 18 from the front end thereof this pivotal provision enables them to shift out of scraping relationship so as to float on or overrun the upper trough litter 96. Thus the scrapers cannot move the upper trough litter to the rear (Figure 2).

When the drive means (motor 66 etc.) is reversed, the active run 38, now in the upper trough, moves forwardly (arrow 100 in Figure 3) and the scrapers 80 bite into the upper trough litter 96 and assume trough-scraping positions. In the transition of the active run 38 from the trough 20 to the trough 18, each scraper will reverse itself about its pintles 88 so that what were the upper and lower edges in the lower trough now become lower and upper edges in the upper trough. The pintles 88 now trail their scrapers rather than lead them, and the pivot axis afforded by the pintles is now above rather than below the run 38. Therefore, the portion of the scraper depending from the pintle axis abuts the present front portions of the lugs 86 to reconstitute the one-way drive or stop device 91 and again the scrapers cannot pivot clockwise (Figure 7) relative to the run 38.

Since the scrapers 80 are now in trough-scraping relation to the upper trough 18 and are moved in the direction of the arrow 100 as the conveyor is reversed, the upper trough litter is discharged at the single discharge point and the active run 38 ultimately returns to a position preliminary to its starting position, as shown in Figure 4. The scrapers again pivot about their pintles to assume horizontal positions as they move downwardly from the conveyor support 30 to the conveyor support 34 and being substantially balanced tend to remain in that horizontal position as they re-enter the lower trough 20 when the run 38 replaces the run 40, the latter returning of course to its starting position in the upper trough. There will at this time be no litter in the lower trough. The scrapers may be manually returned to their upright or starting positions as in Figure 1 by turning them clockwise through substantially 90° from their positions of Figure 4 to their positions of Figure 1, and again the one-way drive device will be activated for a further cycle.

As best shown in Figures 8 and 9 each scraper is notched at 102 at its opposite ends to accommodate the guides 60. Stated otherwise, the width of the lower trough 20 slightly exceeds that of the upper trough. Consequently, the scraper is wider in its portion 84 than it is in its portion 82. The guides 60 do not interfere with the pivot lugs 86, since these lugs are on top of the chain when the run 38 is in the upper trough. In the preferred construction illustrated the lugs 86 are formed integral with or welded to the proximate links of the chain.

The operational characteristics have been covered above in the detailed description and need not be repeated. Suffice it to observe that the single conveyor performs not only a dual function but does this in such manner that the upper and lower troughs are cleaned and the litter therefrom is discharged at a single point. The apparatus is simple and inexpensively constructed and may be readily adapted to existing poultry systems. Features of the invention not categorically enumerated herein will readily occur to those versed in the art, as will modifications and alterations in the preferred structure illustrated, all of which may be achieved without departure from the spirit and scope of the invention.

What is claimed is:

1. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor having an active run normally extending fore and aft in the lower trough, a secondary run in the upper trough, and opposite generally upright end runs; means mounting the conveyor on the support structure for movement in such direction and amount that the active run travels forwardly in the lower trough, then upwardly and then rearwardly in the upper trough to replace the secondary run and for reverse movement so that the active run then travels forwardly in the upper trough, then downwardly and then rearwardly in the lower trough to its normal position; a plurality of trough scrapers spaced apart lengthwise of the active run, each scraper having upper and lower edge portions normally projecting respectively above and below the normally positioned active run with the lower edge in scraping relation to the bottom of the lower trough; a plurality of pivot means, one connecting each scraper to the active run on a transverse pivot axis ahead of the scraper so that the scraper is drawn forwardly as the active run moves forwardly in the lower trough, each pivot means enabling its scraper to turn about its axis as the active run enters the upper trough so that the upper edge of the scraper becomes a scraping edge in the upper trough; and a plurality of one-way stop means on the active run, one backing up each scraper against rearward swinging as the scraper engages trough litter during forward travel of the active run, and each stop means enabling pivoting of its scraper during rearward travel of said active run.

2. The invention defined in claim 1, in which: the conveyor comprises a pair of endless elements spaced apart transversely of the trough and the scrapers extend across between said elements in the active run; and transverse spacer means extend across and maintain the spaced apart relation of the elements in the secondary run, said spacer means being spaced above the level of the bottom of the upper trough so as to be out of contact with said bottom.

3. The invention defined in claim 1, in which: the conveyor comprises a pair of parallel endless elements spaced apart on the order of the trough width; each pivot means comprises a pair of transversley alined pivot lugs respective on the elements in the active run and pintle means engaging the scraper and the associated pair of brackets.

4. The invention defined in claim 1, in which: each trough has a floor and opposite side walls; the upper trough includes a guide inwardly of and along each of its side walls and said guide has an upper surface intermediate the floor and the top of the side wall; the conveyor comprises a pair of parallel endless elements spaced apart transversely so as to ride on the guide surfaces when the conveyor travels through the upper trough; transverse spacer means cross-connecting the elements in the secondary run and maintaining the elements in spaced relation so as to prevent the elements from slipping inwardly off of the guide surfaces; and the scrapers serving as spacers for the same purpose in the active run of the conveyor.

5. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor assuming a first position having an active run extending fore and aft in the lower trough, a secondary run in the upper trough, and opposite generally upright end runs; means mounting the conveyor on the support structure for movement in such direction and amount to a second position so that the active run travels forwardly in the lower trough, then upwardly and then rearwardly in the upper trough to replace the secondary run and for reverse movement so that the active run then travels forwardly in the upper trough, then downwardly and then rearwardly in the lower trough to its first position; a plurality of trough scrapers spaced apart lengthwise of only the active run and depending into only the lower trough in said first position and depending into only the upper trough in said second position; and a plurality of one-way connecting devices respectively mounting the scrapers on the active run in trough scraping relation when the active run travels forwardly in either trough, said devices including means providing for shifting of the scrapers out of trough-scraping relation when the active run travels rearwardly.

6. The invention defined in claim 5, in which: the conveyor comprises a pair of endless elements spaced apart transversely of the trough and the scrapers extend across between said elements in the active run; and transverse spacer means extend across and maintain the spaced apart relation of the elements in the secondary run, said spacer means being spaced above the level of the bottom of the upper trough so as to be out of contact with said bottom.

7. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor assuming a first position having an active run extending fore and aft in the lower trough, a secondary run in the upper trough, and opposite generally upright end runs; means mounting the conveyor on the support structure for movement in such direction and amount to a second position so that the active run travels forwardly in the lower trough, then upwardly and then rearwardly in the upper trough to replace the secondary run and for reverse movement so that the active run then travels forwardly in the upper trough, then downwardly and then rearwardly in the lower trough to its first position; a plurality of trough scrapers spaced apart lengthwise of and respectively pivoted to only the active run on transverse axes for one-way swinging relative to said active run so as to assume trough-scraping positions during forward travel of the active run in either trough and so as to pivot and overrun litter in the upper trough during rearward travel of the active run in said upper trough whereby in the first position of the conveyor the scrapers occupy and partition only the lower trough and in said second position the scrapers occupy only the upper trough.

8. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor assuming a first position having an active run extending fore and aft in the lower trough, a secondary run in the upper trough, and opposite generally upright end runs; means mounting the conveyor on the support structure for movement in such direction and amount to a second position so that the active run travels forwardly in the lower trough, then upwardly and then rearwardly in the upper trough to replace the secondary run and for reverse movement so that the active run then travels forwardly in the upper trough, then downwardly and then rearwardly in the lower trough to its first position; a plurality of trough scrapers spaced apart lengthwise of only the active run and arranged to scrape trough litter as the active run travels forwardly in either trough and to overrun upper trough litter as the active run travels rearwardly in said upper trough.

9. The invention defined in claim 8, including: means engaging the secondary run from below for preventing said secondary run from sagging into litter in the upper trough.

10. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor assuming a first position having an active run extending fore and aft in the lower trough, a secondary run in the upper trough, and opposite generally upright end runs; means mounting the conveyor on the support structure for movement in such direction and amount to a second position so that the active run travels forwardly in the lower trough, then upwardly and then rearwardly in the upper trough to replace the secondary run and for reverse movement so that the active run then travels forwardly in the upper trough, then downwardly and then rearwardly in the lower trough to its first position; a plurality of trough scrapers spaced apart lengthwise of only the active run and carried thereby to interchange from trough to trough with said active run engaging litter in whichever trough the active run travels forwardly in whereby in the first position of the conveyor the scrapers occupy and partition only the lower trough and in the second position the scrapers occupy only the upper trough; and means for causing the scrapers to move to litter-overrunning positions when the active run travels rearwardly in the troughs.

11. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor having an active run normally extending fore and aft in the lower trough, a secondary run in the upper trough, and opposite generally upright end runs; means mounting the conveyor on the support structure for movement in such direction and amount that the active run travels forwardly in the lower trough, then upwardly and then rearwardly in the upper trough to replace the secondary run and for reverse movement so that the active run then travels forwardly in the upper trough, then downwardly and then rearwardly in the lower trough to its normal position; and trough-scraping means carried by only the active run and operative to scrape a trough during forward travel of the active run and to overrun trough litter during rearward travel of the active run.

12. The invention defined in claim 11, in which: the conveyor comprises a pair of endless elements spaced apart transversely of the trough and the trough-scraping means extends across between said elements in the active run; and transverse spacer means extend across and maintain the spaced apart relation of the elements in the secondary run, said spacer means being spaced above the level of the bottom of the upper trough so as to be out of contact with said bottom.

13. In a poultry cage system having upper and lower fore-and-aft tiers of cages for housing poultry whose litter drops through the bottoms of the respective cages, the improvement comprising: support structure including upper and lower fore-and-aft troughs respectively spaced directly below and substantially coextensive with the cages for receiving litter therefrom, each trough having a rear end and a forward discharge end; an endless conveyor carried by the support structure in a first position having upper and lower runs extending fore-and-aft respectively in the upper and lower troughs and opposite generally upright end runs, a plurality of trough scrapers spaced apart fore-and-aft and, in said first position of the conveyor, disposed crosswise of the lower trough to partition said trough into a plurality of litter-receiving pockets; connecting means connecting the scrapers to the lower run for travel with said lower run at all times; drive means for driving the conveyor first in such direction and amount that the lower run travels forwardly in the lower trough, then upwardly and then rearwardly into the upper trough, thereby replacing the upper run in the upper trough while the upper run moves into the lower trough, said scrapers moving with the lower run and now occupying a second position spaced apart fore-and-aft in the upper trough; said connecting means including one-way drive devices causing the scrapers to scrape the lower trough when said lower run travels forwardly in the lower trough and enabling the scrapers to overrun litter in the upper trough when the lower run travels rearwardly in said upper trough; said drive means being reversible to move the conveyor back to said first position so that the lower run travels forwardly in the upper trough and then returns to the lower trough; said one-way devices causing the scrapers to scrape the upper trough during said forward movement of the lower run in the upper trough and enabling the scrapers to overrun the lower trough as the lower run returns to its first position in said lower trough.

14. The invention defined in claim 13, in which: the connecting means for each scraper includes pivot means on a transverse axis enabling swinging of the respective scraper when the lower run travels rearwardly in either trough, each one-way device preventing swinging of the respective scraper when the lower run travels forwardly in either trough.

References Cited in the file of this patent

UNITED STATES PATENTS

| | | |
|---|---|---|
| 2,294,025 | Dagg | Aug. 25, 1942 |
| 2,309,458 | Ingraham | Jan. 26, 1943 |
| 2,687,113 | Gault | Aug. 24, 1954 |

FOREIGN PATENTS

| | | |
|---|---|---|
| 669,164 | Great Britain | Mar. 26, 1952 |